(12) United States Patent
Lin et al.

(10) Patent No.: US 7,196,778 B2
(45) Date of Patent: Mar. 27, 2007

(54) CIRCUITRY AND METHOD FOR MEASURING TIME INTERVAL WITH RING OSCILLATOR

(75) Inventors: Yeah-Min Lin, Jhongli (TW); Kuang-Tso Luo, Taipei (TW); Ren-Her Chen, Taoyuan Hsien (TW); Sau-Mou Wu, Yangmei Township, Taoyuan County (TW); Yun-Hsien Lin, Wurih Township, Taichung County (TW); Tsun-Hsin Wang, Kouhu Township, Yunlin County (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 288 days.

(21) Appl. No.: 10/891,168

(22) Filed: Jul. 13, 2004

(65) Prior Publication Data

US 2005/0259239 A1 Nov. 24, 2005

(51) Int. Cl.
*G01C 3/08* (2006.01)
(52) U.S. Cl. ............... 356/5.01; 356/5.02; 356/5.03; 356/4.01

(58) Field of Classification Search ............... 356/5.01
See application file for complete search history.

(56) References Cited

U.S. PATENT DOCUMENTS 5,619,134 A * 4/1997 Watanabe et al. ........... 324/225
5,812,427 A * 9/1998 Nonoyama et al. ......... 702/141

* cited by examiner

*Primary Examiner*—Thomas H. Tarcza
*Assistant Examiner*—Luke Ratcliffe
(74) *Attorney, Agent, or Firm*—J.C. Patents

(57) ABSTRACT

A circuitry for measuring a time interval with ring oscillator has a ring oscillator formed by a plurality of delay switching units, a counter and an encoder. Wherein, the ring oscillator generates a plurality of oscillating signals when receives a pulse signal used to turn on or turn off the ring oscillator. The counter can count the numbers of the oscillating signal during an active period of the pulse signal to generate a counting value. In addition, the encoder encodes the oscillation signals generated by a plurality of delay switching unit with a certain interval of delay time. Therefore, when the pulse signal is disabled to lead to turn off the ring oscillator, one can obtain the time interval of the pulse signal based on the encode data and the counting value.

18 Claims, 10 Drawing Sheets

| Encoded value | E0 | E1 | E2 | E3 | E4 | D3 | D2 | D1 | D0 |
|---|---|---|---|---|---|---|---|---|---|
| 1 | 0 | 0 | 1 | 0 | 1 | 0 | 0 | 0 | 1 |
| 2 | 0 | 1 | 1 | 0 | 1 | 0 | 0 | 1 | 0 |
| 3 | 0 | 1 | 0 | 0 | 1 | 0 | 0 | 1 | 1 |
| 4 | 0 | 1 | 0 | 1 | 1 | 0 | 1 | 0 | 0 |
| 5 | 0 | 1 | 0 | 1 | 0 | 0 | 1 | 0 | 1 |
| 6 | 1 | 1 | 0 | 1 | 0 | 0 | 1 | 1 | 0 |
| 7 | 1 | 0 | 0 | 1 | 0 | 0 | 0 | 1 | 1 |
| 8 | 1 | 0 | 1 | 0 | 0 | 1 | 0 | 0 | 0 |
| 9 | 1 | 0 | 1 | 0 | 1 | 1 | 0 | 0 | 1 |
| 10 | 1 | 0 | 1 | 0 | 1 | 0 | 0 | 0 | 0 |

FIG. 7C

CIRCUITRY AND METHOD FOR MEASURING TIME INTERVAL WITH RING OSCILLATOR

BACKGROUND OF THE INVENTION

1. Field of Invention

The present invention relates to a circuit for measuring time interval, and more particularly, to a circuit for measuring a time interval using ring oscillator scheme.

2. Description of the Related Art

In signal processing field, a time interval corresponding to the pulse width of a pulse signal, or a time interval between two digital pulse edges is usually needed. For example, when measuring distance with laser, calculating a time interval between the start digital signal when emitting laser pulse and the stop digital signal when receiving the reflected laser signal from the object, and multiplying with light speed, a distance between the origin and the object is obtained. Generally speaking, the time interval described above is substantially short, usually measured in the order of nanosecond (ns). Therefore, it is desired to measure a time interval with high precision.

Referring to FIG. 1, it illustrates a circuit for measuring time interval. In FIG. 1, the time interval measuring circuit is named as propagation delay time-to-digital converter (TDC), including a plurality of propagation delay units 101 connected in series, an assembled with an encoder 103. Wherein the propagation delay time of the propagation delay unit is used as a unit time. When a pulse signal $V_1$ is fed to the starting terminal Start, the propagation delay TDC begins to propagate signal $V_1$, and subsequently changes the state of each propagation delay unit. After a specific number of propagation delay unit times, a $V_2$ signal is received and signals of each of the propagation delay units are transferred to the encoder, where an amount of propagation delay unit is readout, such that the time interval $T_{in}$ corresponding to input signals $V_1$ and $V_2$ is measured. This propagation delay TDC provides high precision (tens of ps), yet is limited in expandability and measuring range. If to increase measuring range, an amount of propagation delay units is increased, yet complexity of circuit layout is increase along, which is hard to implement.

Referring to FIG. 2, it illustrates a time interval measuring circuit named as linear time-to-digital converter (TDC), using pulse-shrinking delay elements, e.g. PDE 201 along with delay locked loop 203. When the input pulse signal $V_{in}$ is fed to the first PDE 201, each pulse-shrinking delay element serves to reduce a constant pulse width from the pulse signal $V_{in}$, the last stage of the delay unit adjusts the bias signal $V_{bias}$ such that time span shortened by the delay unit is changed till pulse width of the input signal $V_{in}$ is equal to zero at the output of the last stage. Multiplying the adjusted time span with the amount of the delay units under designed, then the time interval corresponding to the pulse width of the pulse signal is obtained. The linear TDC is more stable when the temperature varies, yet the bias voltage $V_{bias}$ has to be calibrated during measurement for different pulse widths of the pulse signal $V_{in}$, where measurement precision and range are limited by an amount of delay units and bias voltage adjusting range.

Referring to FIG. 3, it illustrates another conventional time interval measuring circuit. In FIG. 3, the circuit is named as cyclic time-to-digital converter (TDC), using pulse-shrinking delay element 301 for constantly reducing pulse width of the input pulse signal $V_{in}$, and feeding back the pulse signal $V_{in}$ via the delay line circuit 303 till the pulse width of the pulse signal is reduced to zero. Wherein the delay line circuit 303 has a plurality of delay units 311, for example. When the pulse width of the pulse signal becomes zero, the counter 305 accumulates the times that pulse signal $V_{in}$ passes through the delay line circuit for calculating the time interval corresponding to the pulse width of the pulse signal $V_{in}$. The cyclic TDC improves the calibrating procedure of the linear TDC as mentioned above, yet the resulting value will receive delay by multiple times for repeatedly inputting signal to the pulse-shrinking delay element. The measuring range of the cyclic TDC is limited by the maximum delay time featured with the delay line circuit 303. When attempting to increase the measuring range, the complexity of circuit structure is increased as well.

SUMMARY OF THE INVENTION

In the light of the above description, the present invention is directed to a circuitry for measuring a time interval using ring oscillator scheme, wherein the time interval of a signal is measured with simple circuit structures.

The present invention is directed to a method for measuring a time interval, wherein measuring range is flexibly increased without increasing complexity of circuitry.

The present invention is directed to a method for measuring a time interval, wherein the time interval is precisely measured with simple calibration procedure.

According to an embodiment of the present invention, the circuit for measuring time interval using ring oscillator scheme, serving to detect time interval corresponding to the pulse width of a pulse signal under test, comprises a ring oscillator module, a counter and an encoder. Wherein the ring oscillator module is turned on and off by the input pulse signal and generates oscillating signal, where the ring oscillator module has a plurality of oscillating output terminals, for correspondingly outputting the oscillating signals. Moreover, the encoder has a plurality of encoding input terminals, coupled to the oscillating output terminals correspondingly, for receiving oscillating signals generated by the ring oscillator module for further encoding. The counter generates a counted value based on oscillating signal outputting from the ring oscillator module.

The ring oscillator module comprises an odd number of delay switching units, for outputting the aforementioned oscillating signals. Wherein an input of the first delay switching unit receives the pulse signal and an output of the last delay switching unit, and the outputs of all the delay switching units except the last one are coupled to an input of a next delay switching unit. Besides, each of delay switching units is coupled to corresponding oscillating output terminal, where the pulse signal width1 is subtracted by a unit delay unit time for the pulse signal passing each delay switching unit sequentially, till the pulse signal width becomes zero.

According to an embodiment of the present invention, the output terminal of the last delay switching unit is coupled to the counter, such that an amount of oscillating signals outputted from the last delay switching unit is counted to be a counted value.

Wherein, the first of the aforementioned delay switching units comprises a NAND gate and a switching circuit. The NAND gate has two input terminals, where the first input terminal serves to receive the input pulse signal, and the other input terminal serves to receive the output of the last delay switching unit. The switching circuit couples an output of the NAND gate to a corresponding oscillating output terminal, and determines whether conducting the path or not according to the pulse signal.

Moreover, each of the delay switching units except the first one comprises an inverter and a switching circuit. An input of the inverter is coupled to an output of the inverter of the previous delay switching unit, and the switching circuit serves to couple the output of the inverter to the corresponding oscillating output terminal, and determines whether to conduct the path or not based on the input pulse signal, thus oscillating signal from each of the delay switching units is fed to the input of the encoder.

In general, each switching circuit comprises a bi-directional switch and a buffer. Wherein one terminal of the bi-directional switch is coupled to the output terminal of the NAND gate or the inverter, and the other terminal of the bi-directional switch is coupled to the buffer input, where the bi-directional switch determines to conduct the path based on the input pulse signal.

According to another embodiment of the present invention, each switching circuit comprises a switching transistor. Wherein a source/drain terminal of the switching transistor is coupled to the output of the NAND gate or the inverter, and the other drain/source terminal of the switching transistor is coupled to an oscillating output terminal, and the gate terminal of the switching transistor receives the input pulse signal. Therefore, the transistor is turned on/off based on the input pulse signal.

According to one embodiment of the present invention, the switching time of the switching circuit is smaller than propagation delay time of the NAND gate and the inverter (in a preferred circumstance, the propagation delay time of the NAND gate and the inverter are equal to each other).

Moreover, according to one embodiment of the present invention, the encoder has a plurality of encoding output terminals. An amount of the encoding output terminals is determined by taking integral of logarithm in base 2 of an amount of inverters, and add one to the resulting number.

According to another aspect, the present invention is directed to a method for measuring time interval. The steps are as follows. Inputting a pulse signal for generating oscillating signals. Subsequently subtracting a unit delay time from the pulse width of the input pulse signal till the pulse width becomes zero. Generating encoded data based on the unit delay time and oscillating signals, and generating a counting data based on one of the oscillating signals. When the pulse width becomes zero, a time interval corresponding to the pulse width of the input pulse signal is determined based on the counting value and the encoded data.

According to one embodiment of the present invention, the steps of generating the encoded data and the counting data are as follows. An oscillating signal is generated for each unit delay time, which is converted to an encoded data, and the last oscillating signal is used for generating a counting data. Where the counting data and the encoded data are recorded in binary format.

From another aspect of the present invention, a method for measuring time interval is provided, comprising the steps as follows. Inputting a reference pulse signal of standard time interval for calibration, and generating a plurality of oscillating signal. Subsequently subtracting a unit delay time interval from the pulse width of the reference pulse signal till the pulse width is equal to zero. Generating an encoded data based on the unit delay time and the oscillating signal, and generating a counting data based on one of the oscillating signals. When the pulse width is equal to zero, calculating a calibration coefficient based on the time interval corresponding to the pulse width of the reference pulse signal, the counting data and the encoded data. Then inputting a pulse signal under test to obtain the time interval. Similarly, subsequently subtracting a unit delay time till the pulse width of the pulse signal under test is equal to zero. When it occurs, a time interval corresponding to the pulse signal under test is obtained based on the counting data, the encoded data and the calibration coefficient.

According to the above descriptions, a ring oscillator module is provided in the present invention using propagation delay time of the delay devices (e.g. NAND gate and inverters) as reference of measuring precision. Therefore, only the parameters of the IC manufacturing process of the inverting devices, an amount of devices and stages of the counter are subjected to change measuring precision and range, where complexity of the circuitry is not increased. Additionally, a standard reference pulse signal is used to generate a calibration coefficient in the present invention, for further measuring purpose, which simplifies calibration procedures and precisely measures the time interval of the pulse signal. Since timing calibration and environmental parameters modification are performed by the post-stage processing circuits and software programs, the structure of the circuitry in the present invention is relatively simple.

BRIEF DESCRIPTION OF THE DRAWINGS

FIG. 7C illustrates an encoding table of the encoder 730.

DESCRIPTION OF THE EMBODIMENTS

Figure 1:
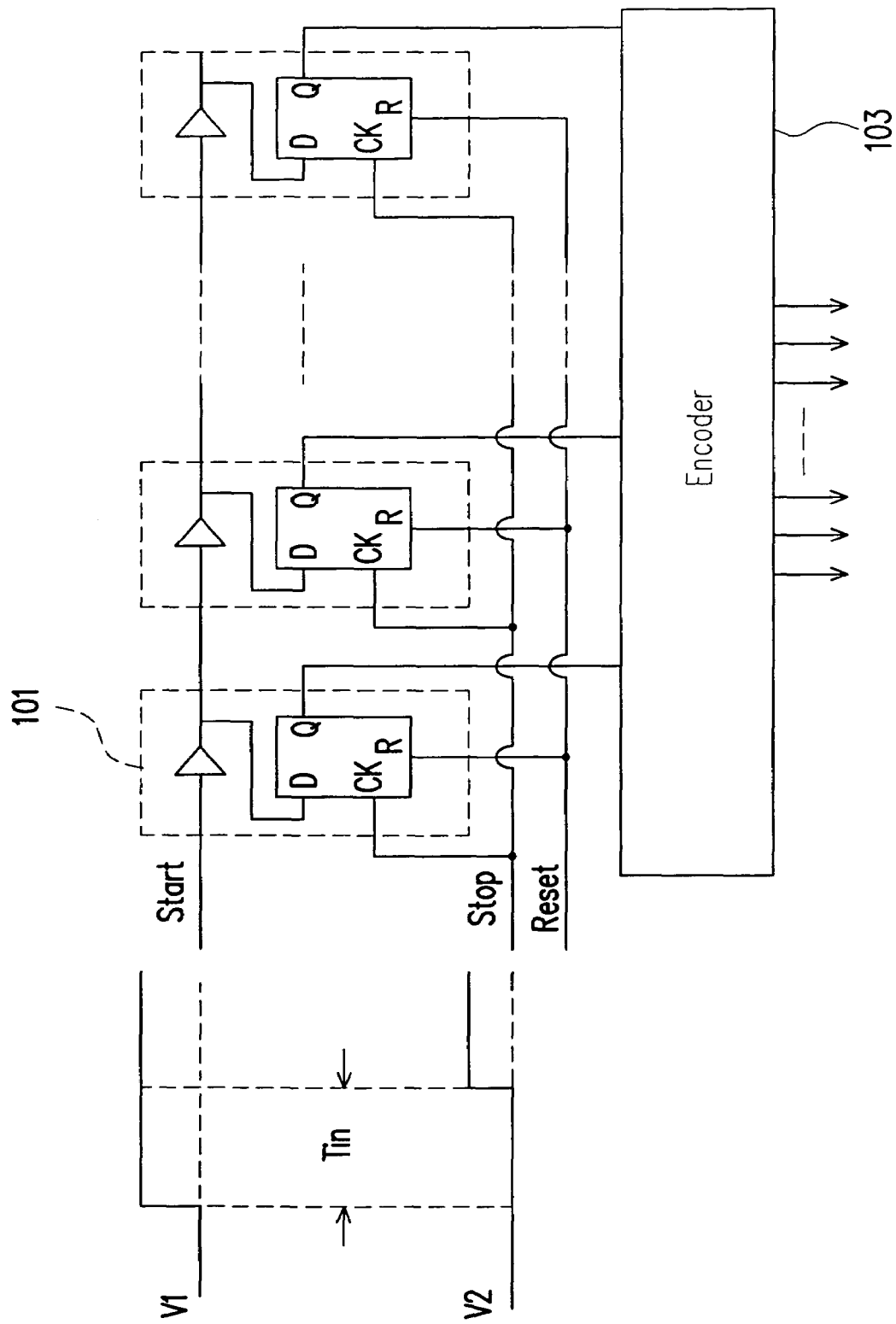
FIG. 1 is a schematic block diagram illustrating a conventional propagation delay time-to-digital converter (TDC) circuit for measuring time interval.
Figure 2:
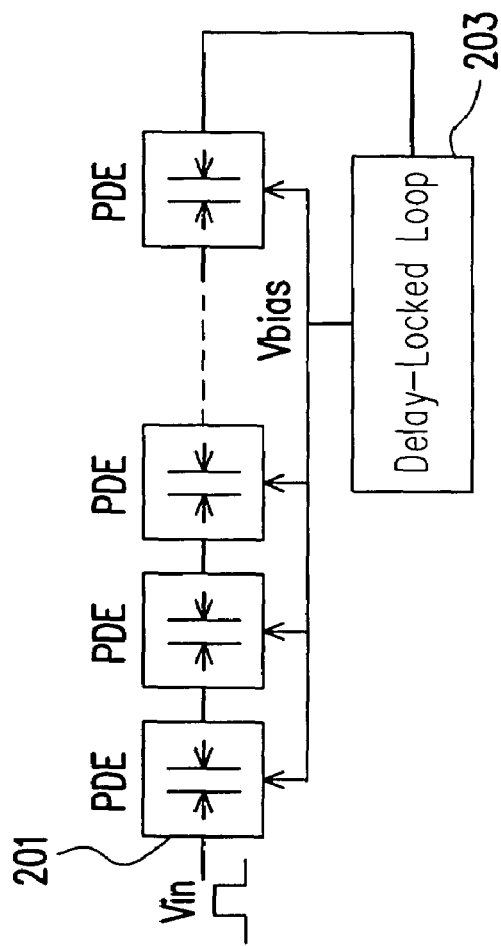
FIG. 2 is a schematic block diagram illustrating a conventional linear TDC circuit for measuring time interval.
Figure 3:
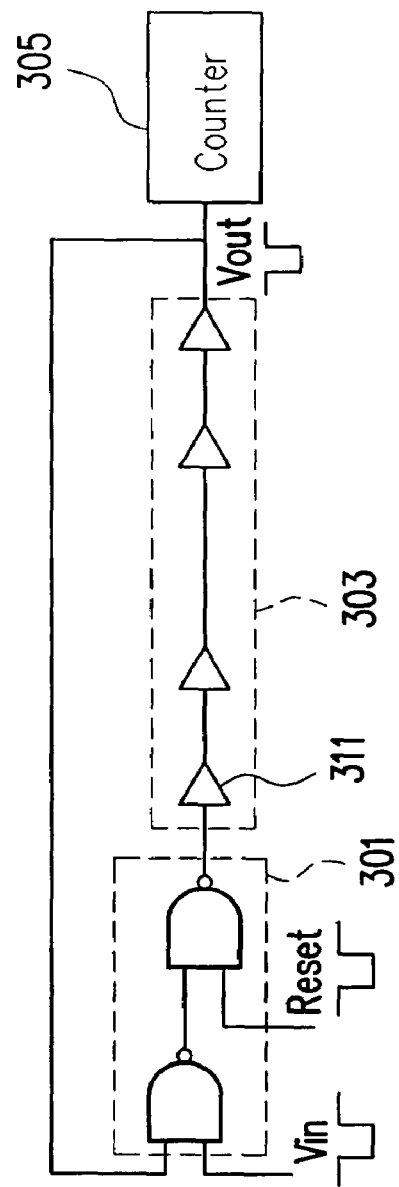
FIG. 3 is a schematic block diagram illustrating a conventional cyclic TDC circuit for measuring time interval.
Figure 4:
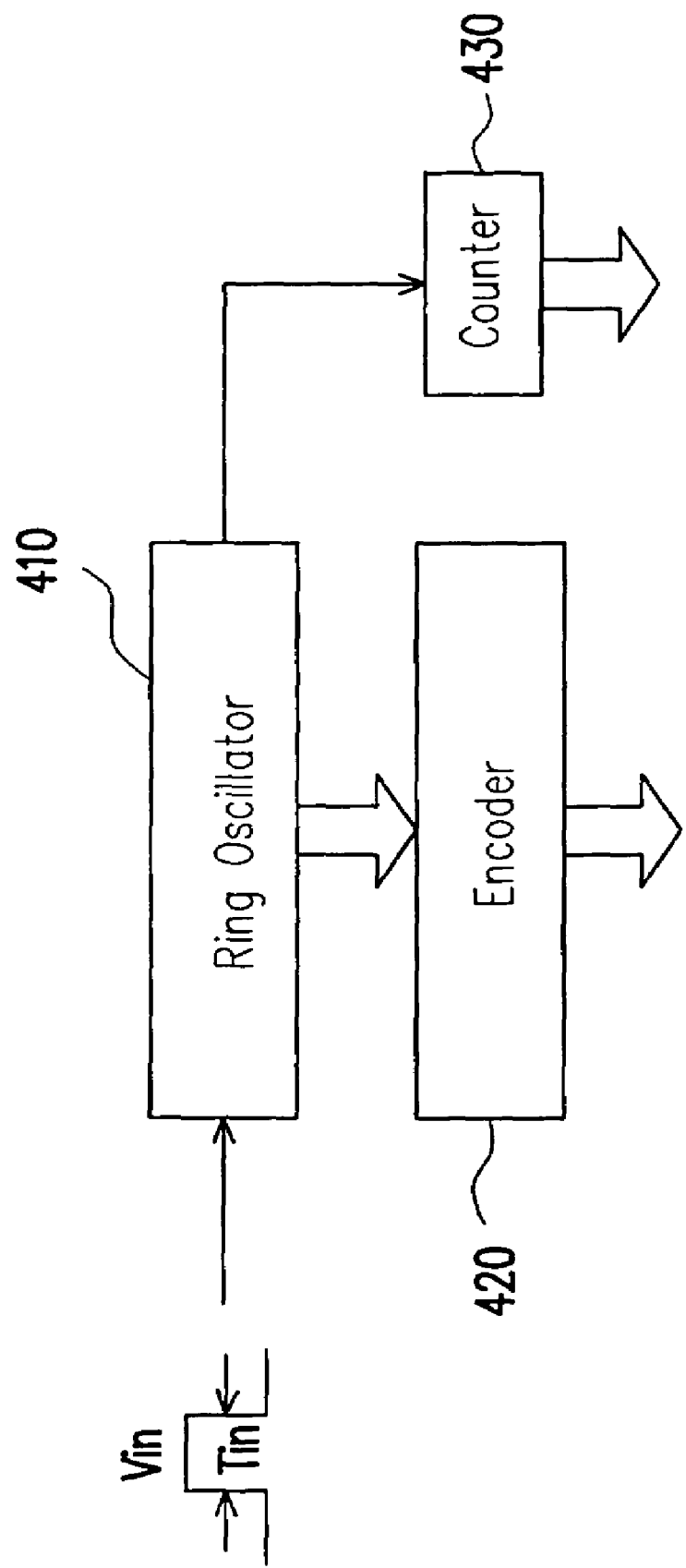
FIG. 4 is a function block diagram illustrating a circuit for measuring time interval using ring oscillator scheme according to one embodiment of the present invention.

Referring to FIG. 4, it illustrates a block diagram of a circuit for measuring the time interval using ring oscillator scheme. In FIG. 4, the ring oscillator module 410 is activated by the input pulse signal $V_{in}$, and generating a plurality of oscillating signals to the encoder 420, so as to generate a plurality of encoded signals by encoding the oscillating signals from the ring oscillator module 410. Moreover, the counter 430 receives oscillating signals generated by the ring oscillator module 410, and generates the counting value based on one of the oscillating signals. When the pulse signal $V_{in}$ becomes zero, a time interval $T_{in}$ corresponding to the pulse width of the pulse signal $V_{in}$ is obtained based on the encoded signal and the counting value.

Figure 5A:
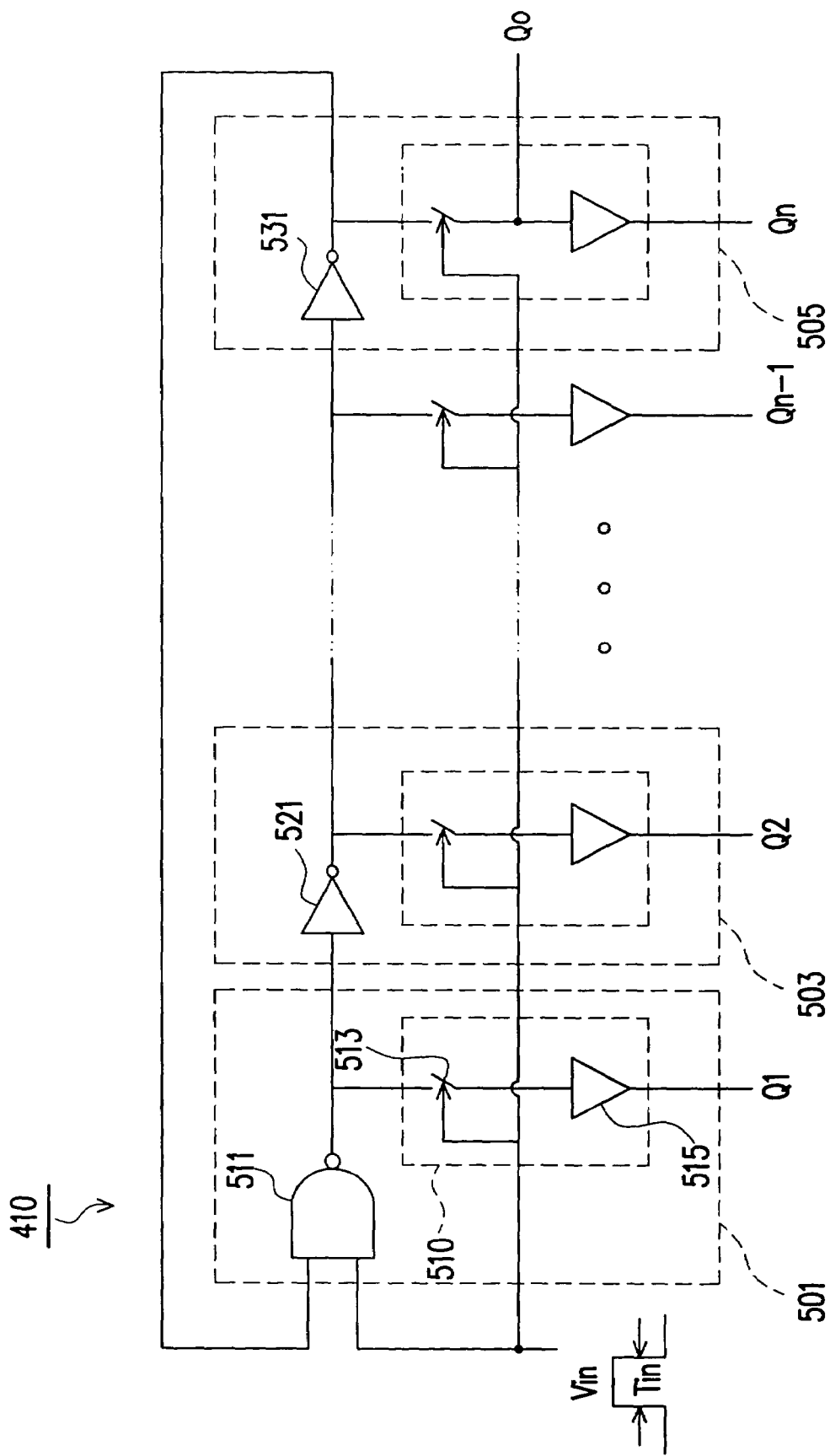
FIG. 5A is a schematic block diagram illustrating an internal logic circuit of a ring oscillator according to one embodiment of the present invention.

Referring to FIG. 5A, it illustrates the internal logic circuit of the ring oscillator module according to one embodiment of the present invention. In FIG. 5A, the ring oscillator module comprises a plurality of delay switching units, e.g. units 501, 503 and 505, for outputting oscillating signals, which are interconnected with each other. Wherein the output of each of the delay switching unit is coupled to the input of next delay switching unit, and is respectively coupled to corresponding oscillating output terminals (Q1~Qn). The output terminal of the last delay switching unit 505 feeds back to the input terminal of the first delay switching unit 501.

According to an embodiment of the present invention, the first delay switching unit 501 comprises a NAND gate 511 and a switching circuit 510. Except the first delay switching unit 501, from the second delay switching unit 503 to the last delay switching unit 505 comprise inverters (e.g. 521, 531). For the skill in the art, it is understood that the inverters can be implemented with NAND gates and other logic gates, which are not limited in the present invention. Wherein one of the input terminals of the NAND gate 511 receives the input pulse signal $V_{in}$, and the other input receives the output of the inverter 531. Moreover, the output of the NAND gate 511 is coupled to the input of the inverter 521. Similarly, the output of each of the inverters is coupled to the input of the inverter of next delay switching unit except the inverter 531.

Additionally, the output of the inverter 531 in the last delay switching unit 505 is coupled to the input terminal Qo of the counter 430 in FIG. 4, for example, in this embodiment. Therefore, the counter 430 generates a counting value based on an amount of clock signal (i.e. oscillating signal) outputting from the inverter 531.

Further in FIG. 5A, each of the delay switching units has a switching circuit 510, for example, for correspondingly coupling the output of the NAND gate 511 and all inverters to the oscillating output terminals Q1~Qn of the ring oscillator module 410. The oscillating output terminals Q1~Qn are coupled correspondingly to the encoding input terminal (not illustrated) of the encoder 420 in FIG. 4. Take switching circuit 510 as an example, it is determined to turn on/off the NAND gate 511 based on the input pulse signal Vin, and similar to other switching circuits.

The switching circuits comprise bi-directional switches and buffers as illustrated in FIG. 5A, for example. In the following descriptions, only the switching circuit 510 is exemplary, and other switching circuit is designed according to the switching circuit 510. In the switching circuit 510, one terminal of the bi-directional switch 513 is coupled to the output terminal of the NAND gate 511, and the other terminal of the bi-directional switch 513 is coupled to the input terminal of the buffer 515. The output of the buffer 515 is coupled to the oscillating output terminal Q1. When the input pulse signal $V_{in}$ is enabled, the bi-directional switch 513 is turned on, thus the NAND gate 511 outputs through the output terminal Q1 of the buffer 515. On the contrary, when the input pulse signal $V_{in}$ is disabled, the bi-directional switch 513 is turned off.

Figure 5B:
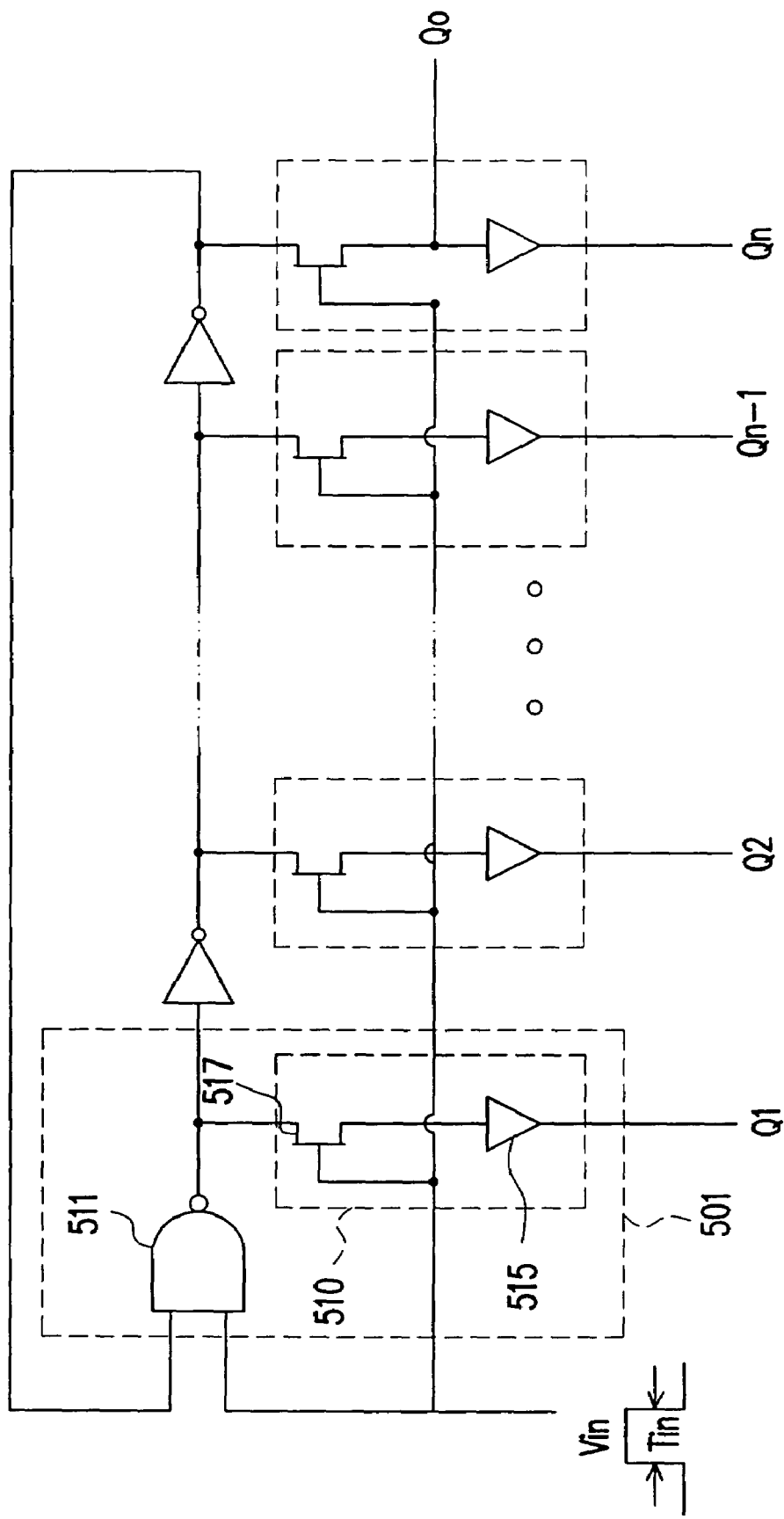
FIG. 5B is another schematic block diagram illustrating an internal logic circuit of a ring oscillator according to one embodiment of the present invention.

Referring to FIG. 5B, it illustrates an internal logic circuit of the ring oscillator module according to an embodiment of the present invention. The switching circuit 510 further comprises a switching transistor 517, for example an NMOS transistor. A source/drain terminal of the NMOS transistor 517 is coupled to the output terminal of the NAND gate 511, and the other drain/source terminal of the switching transistor 517 is coupled to the output terminal of the oscillating terminal Q1. Moreover, the gate terminal of the NMOS transistor 517 is controlled by the input pulse signal $V_{in}$. Therefore, the NMOS transistor 517 is determined to be turned on/off based on the input pulse signal Vin.

Figure 6A:
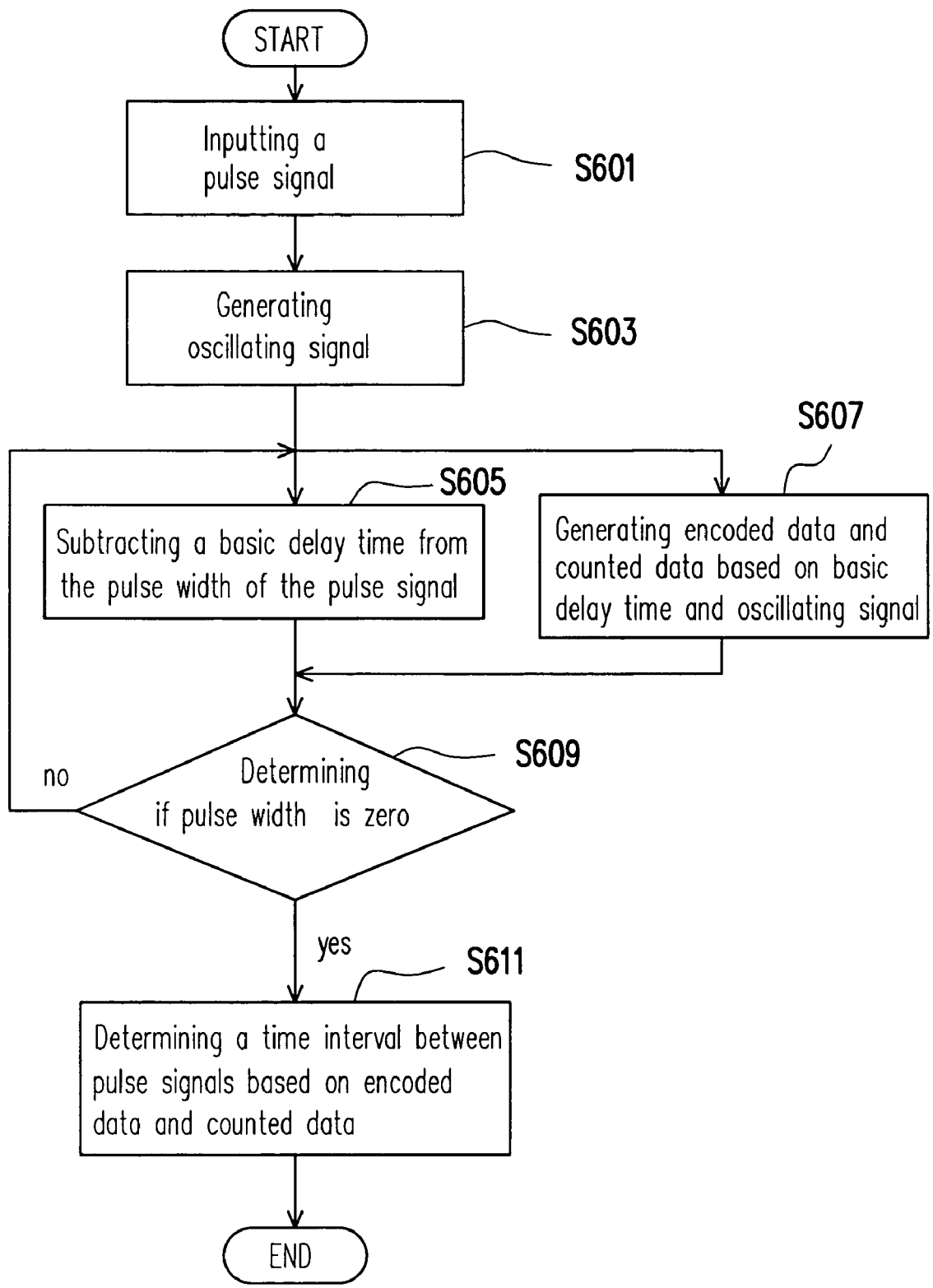
FIG. 6A is a flowchart illustrating a method for measuring a time interval according to one embodiment of the present invention.

Referring to FIG. 6A, it illustrates the flowchart of a method for measuring time interval according to one embodiment of the present invention. Along with FIG. 5A, when one of the input terminals of the NAND gate 511 in the delay switching unit 501 receives the pulse signal $V_{in}$ as shown in step S601, the ring oscillator module 410 generates oscillating signals from oscillating output terminals Q1~Qn as shown in step S603. The pulse width of the input pulse signal $V_{in}$ is subtracted by a unit delay time for passing each delay switching unit as shown in step S605. Generating encoding data based on the unit delay time and the oscillating signals outputted from the output terminals Q1~Qn, and generating a counting data according to one of the oscillating signals (the last oscillating signal in this embodiment) in step S607. Checking if the pulse width is equal to zero in step S609. If not equal to zero (proceeding to "no" from step S609), repeat step S605. Yet if the pulse width is equal to zero (proceeding to "yes" from step S609), proceeding to step S611 and obtaining the time interval corresponding to the width of the pulse signal based on the encoded data and the counting data.

Figure 6B:
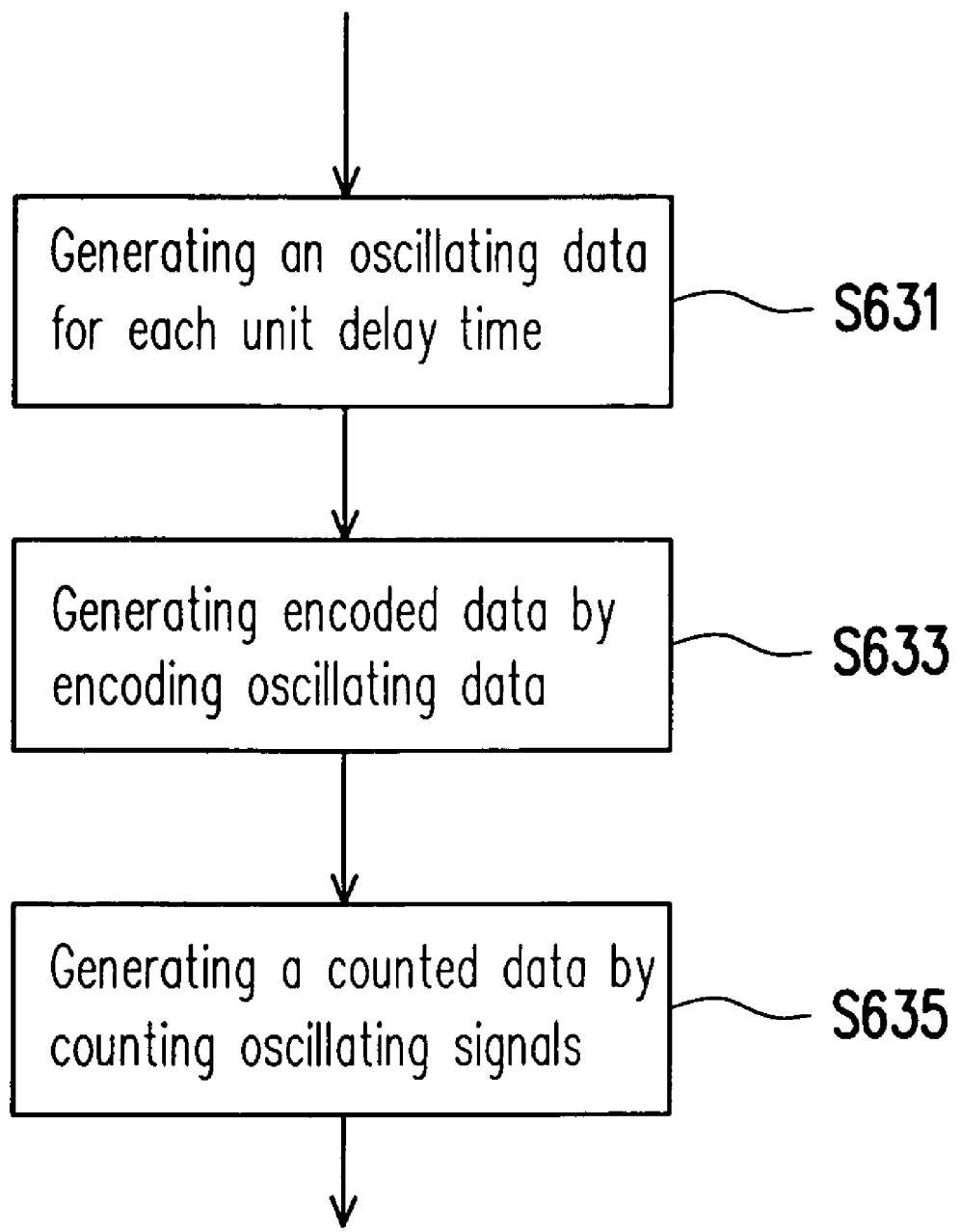
FIG. 6B is a flowchart illustrating a method for generating encoded data and counted data according to one embodiment of the present invention.

Referring to FIG. 6B, it illustrates a flowchart of method for generating encoded data and counting data according to one embodiment of the present invention. Referring to FIG. 6A along with FIG. 6B, when the pulse signal $V_{in}$ is fed to the ring oscillator module 410, the oscillating data composing of the oscillating signals outputted from the oscillating output terminals Q1~Qn are generated for each unit delay time as shown in step S631. When the encoder 420 receives the oscillating data, the encoded data is generated. The counter 430 receives the output of oscillating signal from the ring oscillator module 410. Moreover, the counter 430 counts a number of the last oscillating signal for generating the counting data in step S635.

According to the above descriptions, the present invention comprises dividing a period of an oscillating signal with a propagation delay time of the delay switching unit, and encoding all of the oscillating signals outputted for each unit delay time. Therefore, when the input pulse signal activates the ring oscillator module, an amount of delay switching unit time of the last oscillating clocking before the input signal is stopped is readout from the output of the encoder, plus an amount of last oscillating signals counted by the counter, then the time interval of the input signal under test is obtained.

For the skill in the art, in order to understand further about present invention, a 5-stage ring oscillator module is exemplary in the following description.

Figure 7A:
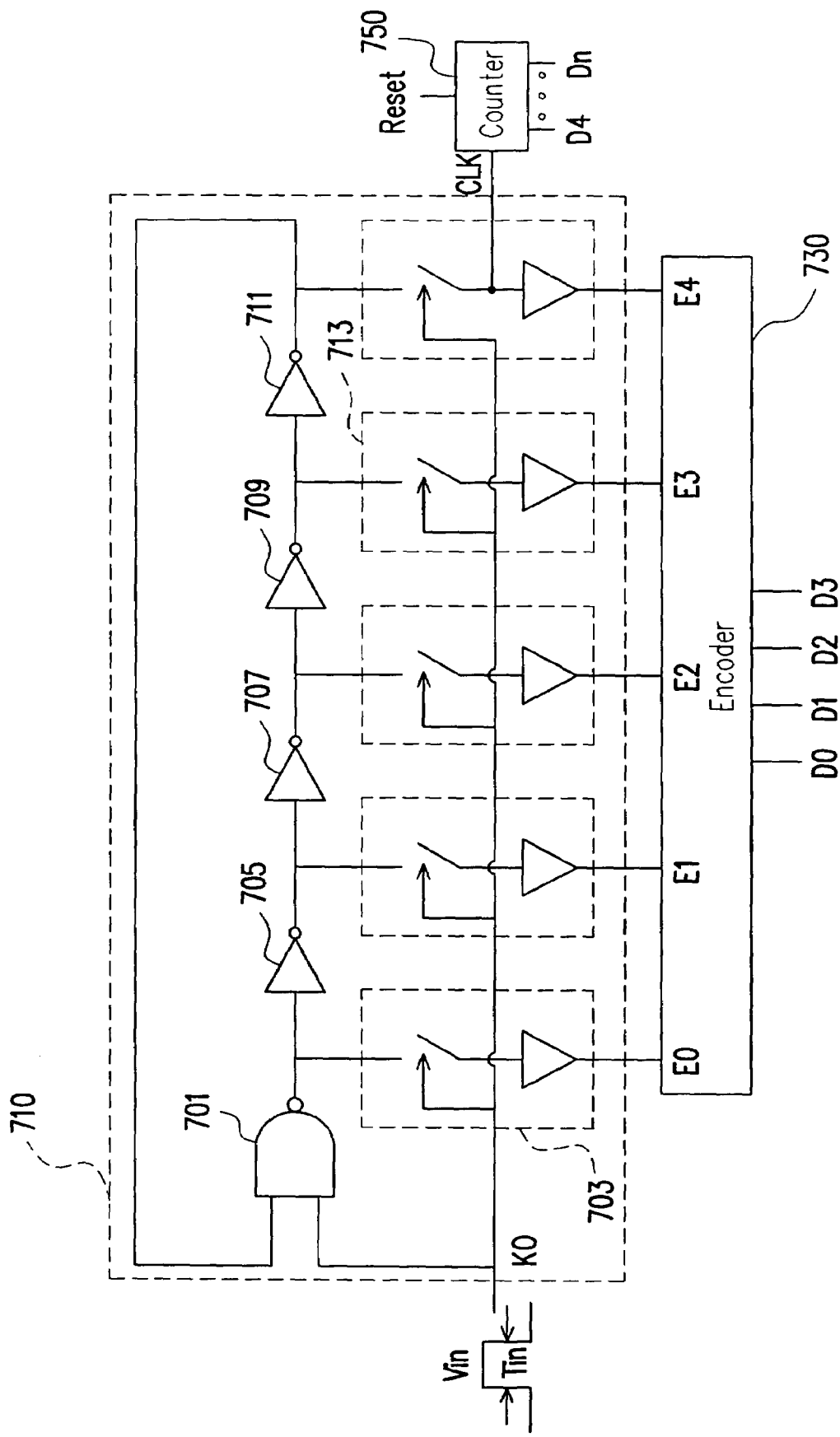
FIG. 7A is a schematic block diagram illustrating a circuit of 5-stage ring oscillator according to one embodiment of the present invention.

Referring to FIG. 7A, it illustrates the circuit of a 5-stage ring oscillator module according to one embodiment of the present invention. In FIG. 7A, an amount of stages of the ring oscillator module is determined by an amount of the NAND gate and inverters. More precisely speaking, an amount of stages of the ring oscillator module is determined based on an amount of oscillating output terminals. In this embodiment, an amount of oscillating output terminals of the ring oscillator module is 5; therefore the ring oscillator module 710 is defined as 5-stage. In order to generate oscillating signals continuously by the ring oscillator module, the stages of delay unit is an odd number. That is, an amount of the inverters is an even number excluding the NAND gate.

Additionally, the encoder 730 has a plurality of encoding input terminals (E0~E4) and encoding output terminals (D0~D3). Wherein the encoding input terminals E0~E4 are respectively corresponding to oscillating output terminals of the ring oscillator module 710. An amount of encoding output terminals D0~D3 of the encoder 730 is determined according to the following formula:

$$D=1+[\log_2 N]$$

Wherein D is noted as an amount of encoding output terminals (D0~D3) of the encoder 730, N is noted as the stages of the delay unit in the ring oscillator module 710, and [log₂N] is noted as integral of logarithm in base 2 of the delay unit stages in the ring oscillator module 710.

Figure 7B:
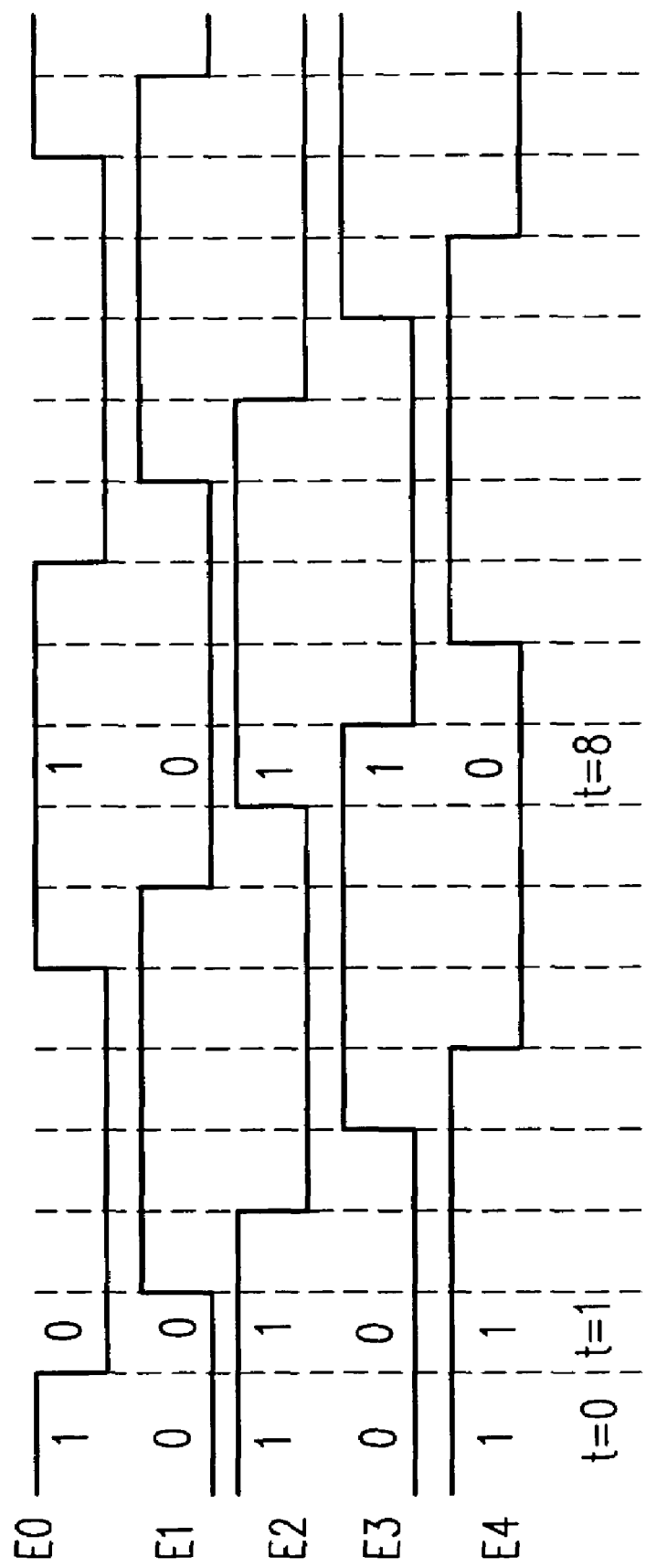
FIG. 7B illustrates a timing diagram of oscillating signal received at input terminal of the encoder in FIG. 7A.

Referring to FIG. 7B, it illustrates the timing diagram of oscillating signal received by the encoder input terminal in FIG. 7A. In FIG. 7B, the waveforms illustrated therein are oscillating signal waveforms at the encoder input terminal E1~E4 at different timing. At the initial state, the input pulse signal Vin is not fed in yet, defining as state 0 at the input terminal K0 of the NAND gate 701. Based on a truth table of the NAND gate, as long as one of the input values of the NAND gate 701 is 0, the output is 1. Therefore, under the initial state of the NAND gate 701, the oscillating signal of the output terminal is at state 1, and oscillating signals of the outputs of the remaining inverters 705, 707, 709 and 711 are respectively at state 0, 1, 0, 1. Providing a pulse signal $V_{in}$ is inputted at t=0, all of the switching circuits, e.g. switching circuit 703, are turned on to conduct a path from oscillating output terminals to the encoder input terminals (E0~E4). However, since the NAND gate 701 has a propagation delay time, the encoding input terminals (E0~E4) are kept at starting state at t=0, that is, 1, 0, 1, 0, 1.

Providing t=1, the pulse signal $V_{in}$ passes through the NAND gate 701 one propagation delay time. The waveform of the encoder input terminal E0 changes from 1 to 0 as shown in FIG. 7B. Since the inverters 705, 707, 709 and 711 need one propagation delay time to pass through the signal as well, the states of oscillating signals received by the remaining encoder input terminals E1~E4 is kept unchanged. Therefore, the states of the oscillating signals received by the output terminals E1~E4 are kept at 0, 1, 0, 1. And consequently, for passing through a NAND gate or an inverter of the pulse signal $V_{in}$, a propagation delay time is cost. In other words, the width of the pulse signal $V_{in}$ is equivalently subtracted by a unit delay time value for passing each NAND gate or inverters. When the pulse width of the input pulse signal is equal to zero, the switching circuit is turned off for the pulse signal Vin is disabled. Providing the pulse width of the pulse signal becomes zero at t=8, the switching circuit 713 is turned off, and the states of the oscillating signals received by the encoder input terminals are 1, 0, 1, 1, 0.

Referring to FIG. 7C, it illustrates an encoding table of the encoder 730. Along with FIG. 7C, when the encoder 730 receives the oscillating data composed of signals outputted from the oscillating output terminals, an encoding procedure is performed according to the encoding table shown in FIG. 7C for outputting encoded data from the encoder output terminals (D0~D3). Providing the oscillating data received by the encoder input terminals E0~E4 are 1, 0, 1, 1, 0, then the encoder output terminals D0~D3 output binary encoded data 1000 based on the encoding table in FIG. 7C. Transforming into decimal format, the encoded binary data 1000 is 8.

Moreover, the ring oscillator module 710 generates oscillating data to the encoder 730, and as the encoder 730 generates encoded data based on the oscillating data, the counter 750 counts an amount of clocking signals (CLK) outputted from the ring oscillator module 710. That is, counting an amount of oscillating signals outputted from the inverter 711. In this embodiment of the present invention, the counter is implemented with a plurality of D flip-flops connected as a ripple counter. Moreover, more D flip-flops can be externally connected for expanding the measuring range of the signal time interval. Besides, the period of clocking signal counted by the counter 750 can be determined based on propagation delay time of the NAND gate 701 and the inverters 705, 707, 709 and 711. When the input pulse signal $V_{in}$ is enabled, the counter 750 serves to count a number of clocking signals (CLK), and to output a counting value from the terminals D4~Dn. When the input pulse signal is disabled, the output terminals D4~Dn of the counter keep the latest counting value.

Referring to FIG. 7A again, an operation method is described in more details hereinafter. When a time interval $T_{in}$ of the input pulse signal $V_{in}$ is measured by the time interval measuring circuit using ring oscillator scheme, a reference pulse signal is inputted firstly, and the time interval $T_{in}$ corresponding to the pulse width of the reference pulse signal is known. When the reference pulse signal is inputted to the circuit of the present invention, a calibration coefficient (α) is obtained according to the following formula:

$$Tin = \alpha\left(counter + \frac{encoder+1}{30}\right) \quad (1)$$

Where counter is noted as the counted value, and encoder is noted as encoded value. Since the time interval $T_{in}$, the counted value counter, and the encoded value encoder are given; thus the calibration coefficient α is obtained.

Then, inputting a pulse signal under test to the circuit of the present invention, where the time interval $T_{in}$ of the pulse signal under test is unknown. Apply the known values of the calibration coefficient α, the counted value counter and the encoded value encoder to the formula (1), the time interval $T_{in}$ corresponding to the pulse width of the pulse signal under test is obtained. The calculation of the time interval described in this embodiment can be implemented with post-stage processing circuit and software programs.

According to the above description, the present invention at least includes the following advantages:

1. Since the time interval of the signal under test is calculated with post-stage processing circuits and software programs, the circuit structure is substantially simple.

2. The measurement of time interval of the signal under test uses propagation delay time characteristics of the devices (NAND gate and inverters) of the ring oscillator module. Therefore, by changing the IC manufacturing process parameters of the devices for adjusting the propagation delay time, an amount of inverters and stages of the counter, the measurement precision and range are adjusted with ease. Yet complexity of circuit structure is not increased.

3. A reference pulse signal is given to obtain a calibration coefficient only at first time operation of the present invention, for further measurement of pulse signal under test is based on the calibration coefficient. Therefore simple calibration procedure is required to get precise measurement in this present invention.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

What is claimed is:

1. A circuit for measuring a time interval of a pulse signal using ring oscillator scheme, for determining the time interval corresponding to a pulse width of the pulse signal, comprising:
    a ring oscillator comprising delay switching units, for receiving the pulse signal in which the time interval corresponding to the pulse width is to be measured, to enable or disable a plurality of oscillating signals, and the ring oscillator having a plurality of oscillating output terminals corresponding to the outputted oscillating signals, respectively;
    an encoder, having a plurality of encoding input terminals, coupled to output terminals of the delay switching units correspondingly, for receiving the oscillating signals for encoding; and
    a counter, for receiving a clock signal for generating a counted value, wherein the clock sianal is output from the last delay switching unit of the delay switching units.

2. The circuit as recited in claim 1, wherein the ring oscillator comprises odd number of the delay switching units, for outputting the oscillating signals, wherein an input terminal of a first delay switching unit receives the input pulse signal and an output terminal of the last delay switching unit, and an output of each of the delay switching units is coupled to input terminal of a next delay switching unit except the last delay switching unit, and each of the output terminal of the delay switching units is coupled to a corresponding oscillating output terminal respectively, when the input pulse signal passes through the delay switching unit, a unit delay time is subtracted from a pulse width of the pulse signal till the pulse width becomes zero.

3. The circuit as recited in claim 2, wherein the output terminal of the last delay switching unit is coupled to the counter, for generating the counted value based on the oscillating signal outputted from the last delay switching unit.

4. The circuit as recited in claim 2, wherein the first delay switching unit comprises:
    a NAND gate, having two input terminals, wherein one input terminal receives the input pulse signal, and the other input terminal is coupled to the output terminal of the last delay switching unit; and
    a switching circuit, coupling an output terminal of the NAND gate and corresponding output terminal of the oscillator, and determining if conducting the output terminal of the NAND gate and the corresponding oscillating output terminal of the oscillator based on an input pulse signal under test.

5. The circuit as recited in claim 4, wherein except the first delay switching unit, all the other delay switching units comprise:
    an inverter, having an input terminal coupled to an output terminal of a previous delay switching unit; and
    a switching circuit, coupling an output terminal of the inverter to the corresponding oscillating output terminal, and determining if conducting the output terminal of the inverter and the corresponding oscillating output terminal based on the input pulse signal under test.

6. The circuit as recited in claim 5, wherein each of the switching circuits comprises:
    a bi-directional switch; and
    a buffer,
    wherein a first terminal of the bi-directional switch is coupled to one of the NOR gate and the output of one of the inverters, and a second terminal of the bi-direction switch is coupled to the buffer, and the bi-directional switch determines to conduct or not based on the input pulse signal under test.

7. The circuit as recited in claim 5, wherein each of the switching circuit comprises a switching transistor, a drain/source terminal of the switching transistor is coupled to one of the NAND gate and an output of the inverter, and an other drain/source terminal of the switching transistor is coupled to the oscillating output terminals, and a gate terminal of the switching transistor is controlled by the input pulse signal.

8. The circuit as recited in claim 4, wherein a switching time of the switching circuits is shorter than a propagation delay time of the NAND gate and the inverter.

9. The circuit as recited in claim 2, wherein a unit time for measuring the time interval of the pulse signal is determined according to a propagation delay time of the NAND gate and the inverter.

10. The circuit as recited in claim 1, wherein the encoder further comprises a plurality of encoding output terminals.

11. The circuit as recited in claim 10, wherein an amount of the encoding output terminals is determined by taking integral of logarithm in base 2 of an amount of the inverters and the NAND gate, and adding one to the resulting number.

12. The circuit as recited in claim 1, wherein the counter comprises a plurality of D flip-flop to form a ripple counter.

13. A method for measuring a time interval, comprising:
    inputting a pulse signal in which a time interval corresponding to a pulse width of the pulse signal is to be determined;
    generating a plurality of oscillating signals through a ring oscillator comprising delay switching units;
    subtracting a unit delay time value from the pulse width of the pulse signal sequentially till the pulse width of the pulse signal becomes zero;
    generating an encoded data based on the unit delay time and the oscillating signals, and generating a counted data based on one of the oscillating signal; and
    determining the corresponding time interval to the pulse width of the pulse signal based on the counted data and the encoded data when the pulse width of the pulse signal is decreased to zero.

14. The method as recited in claim 13, wherein the step of generating the encoded data and the counted data comprises:
    generating an oscillating data for each propagation delay time;
    encoding the oscillating data to obtain the encoded data; and
    counting the clock signal of the oscillating output signal to obtain the counted data.

15. The method as recited in claim 14, wherein the encoded data and the counted data are in binary format.

16. A method for measuring a time interval, comprising:
    inputting a reference pulse signal for generating a plurality of oscillating signals;
    sequentially subtracting a unit delay time from a pulse width of the reference pulse signal till the pulse width is equal to zero;
    generating an encoded data based on the unit delay time and the oscillating signals, and generating a counted data based on one of the oscillating signals;

calculating a calibration coefficient based on a time interval corresponding to the pulse width of the reference pulse signal, the encoded data and the counted data when the width of the reference pulse signal is equal to zero;

inputting a pulse signal under test;

sequentially subtracting a unit delay time from a pulse width of the pulse signal under test till the pulse width is equal to zero; and calculating a time interval corresponding to the pulse width of the pulse signal under test based on the encoded data, the counted data, and the calibrating coefficient when the pulse width of the pulse signal under test is equal to zero.

17. The method as recited in claim 16, wherein the step of generating the encoded data and the counted data further comprises:

generating an oscillating data for each propagation delay time;

generating the encoded data by encoding the oscillating output terminal data; and generating the counted data by counting a post-stage oscillating signal.

18. The method as recited in claim 17, wherein the post-stage oscillating signal is a clock signal.

* * * * *